Figure 1:
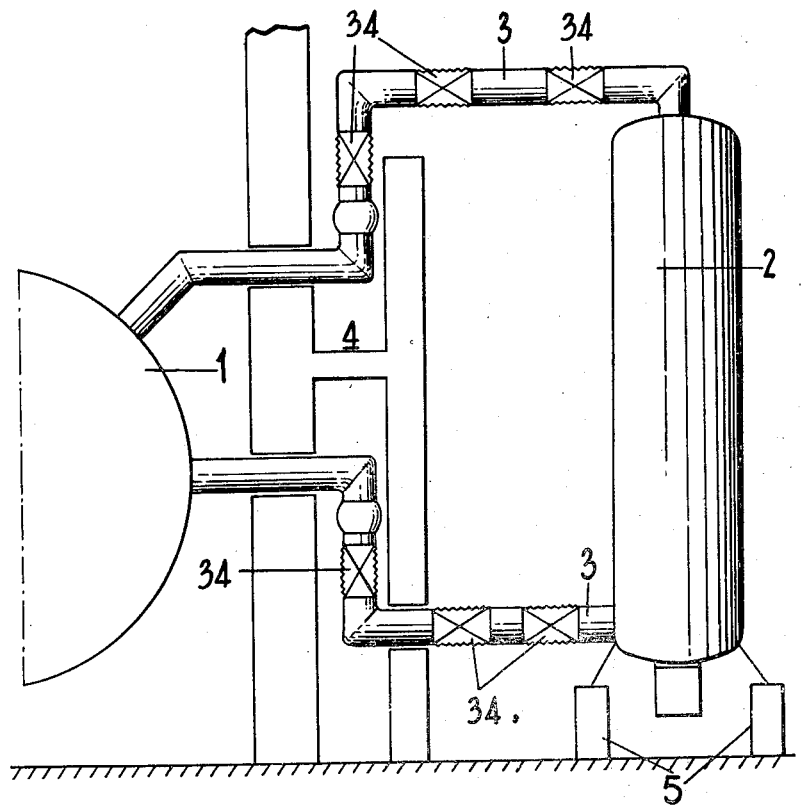

United States Patent Office 2,953,511
Patented Sept. 20, 1960

2,953,511

NUCLEAR REACTOR ARRANGEMENTS

Peter Arnold Lindley, Belvedere, England, assignor to The General Electric Company Limited, London, England Filed Nov. 27, 1956, Ser. No. 624,615

Claims priority, application Great Britain Dec. 2, 1955

6 Claims. (Cl. 204—193.2)

This invention relates to nuclear reactor arrangements and particularly to arrangements of the kind in which a gaseous cooling medium under pressure is arranged to be circulated through the reactor core or body and through a heat exchanger or heat exchangers by one or more blowers of any convenient type. Heat transferred from the reactor core by the cooling medium to a heat exchanger may be used to generate steam which in turn may be used to drive conventional turbo-alternators or similar power generating plant.

A blower may be of the centrifugal or axial flow or mixed type and since it is usual to operate the reactor arrangements, at least for power production purposes, at relatively high gaseous cooling medium pressures, for example of the order of 200 lbs. per sq. inch, the blower need in general only have one impeller through which the cooling medium must pass, the changes in pressure around the circulating circuit being very small compared with the high pressure at which the medium works. If a centrifugal impeller is used, it is necessary to surround this with a diffusing casing designed to recover a maximum amount of pressure energy from the high speed cooling medium leaving the impeller and this casing is of necessity large in diameter in order to act efficiently but, at the same time, is comparatively short in axial length since, in general, only one impeller is necessary. In addition, the diffusing casing is usually scroll shaped in order to improve its efficiency as regards the recovery of pressure energy.

As will be appreciated, these factors controlling the shape of the diffusing casing makes its shape fundamentally unsuited to withstand high internal pressure of the circulating system and the design of a suitable casing to withstand the normal operating pressures presents a serious problem. An object of the present invention is the provision of a nuclear reactor arrangement in which this difficulty is completely avoided.

According to the present invention, in a nuclear reactor arrangement of the kind specified, this object is achieved by arranging an impeller of the blower within an existing pressure vessel or shell, such as a heat exchanger vessel or shell, of the arrangement so that the diffusing casing of the blower is also within the said existing pressure vessel or shell.

It will be appreciated that by placing the impeller and its energy recovering or diffusing casing in an existing pressure vessel or shell, the said casing need only be a light structure designed only to withstand pressure changes within the cooling medium circuit and not the high operating pressure of the medium. Further, since restrictions on the size of the casing due to pressure are eliminated, the casing can be built to extend across a large part or substantially the whole cross-section of the existing pressure vessel or shell resulting in increased blower efficiency.

The invention is applicable to centrifugal blowers, axial flow blowers and mixed flow blowers although in the case of centrifugal blowers, it is likely that the biggest advantages will be achieved.

Figure 2:
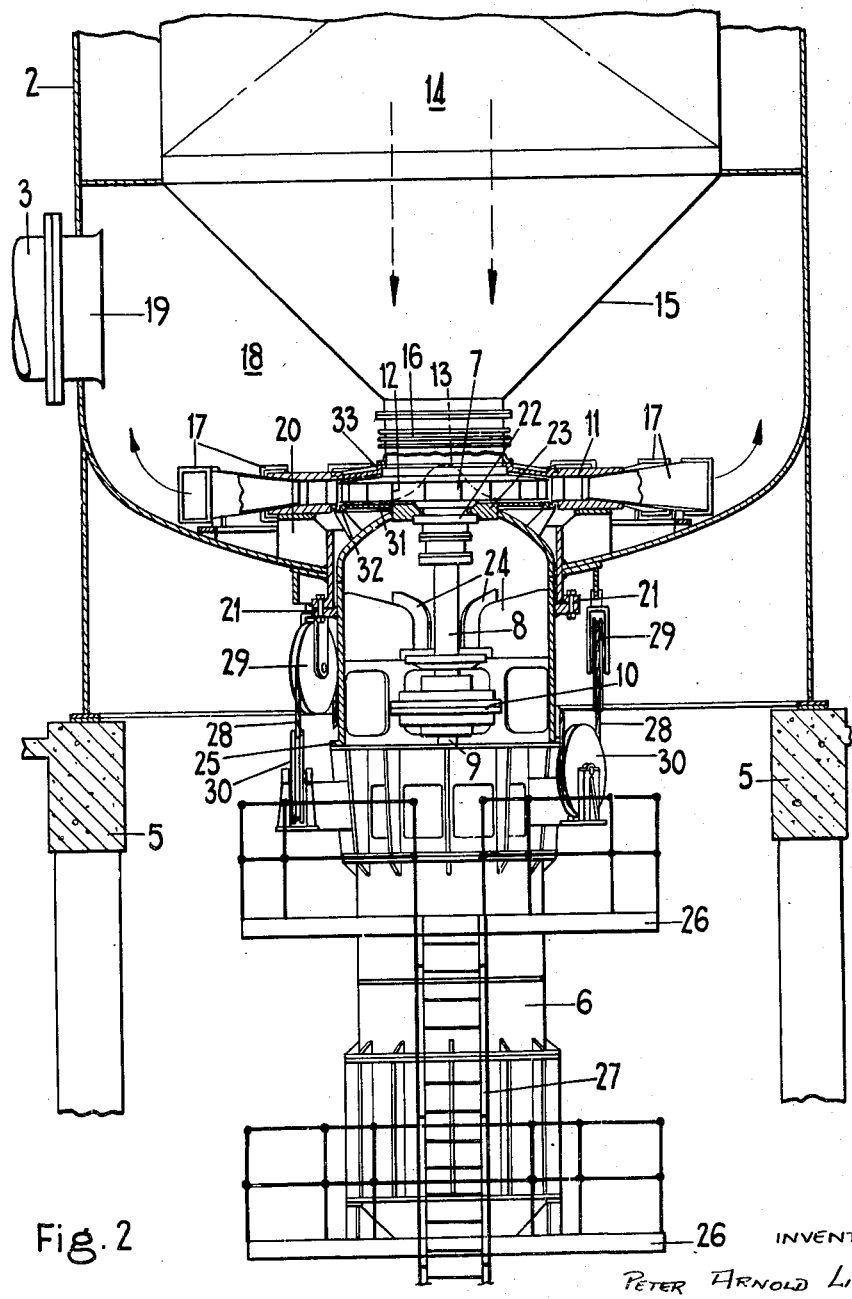

In order that the invention may be clearly understood, one example of a nuclear reactor arrangement in accordance with the invention will now be described by way of example with reference to the two figures of the accompanying drawings in which Figure 1 shows in diagrammatic form the general layout of the reactor arrangement and the gaseous cooling medium circuit and Figure 2 shows to an enlarged scale a central vertical sectional view of the lower end of a heat exchanger vessel of the arrangement.

Referring now to the drawings, more particularly Figure 1 thereof, the nuclear reactor arrangement comprises a pressure vessel 1 housing the reactor core or body (not shown) and a heat exchanger vessel 2 connected with the vessel 1 by way of ducting 3 for the flow of the coolant gas, the vessels 1 and 2 are separated by a double wall 4 and the vessel 2 is supported upon a pedestal structure 5 with its axis vertical. The general construction of the reactor vessel 1 and exchanger vessel 2 will follow normal practice but, in accordance with the present invention, the pressure vessel or shell of the heat exchanger is used to house the impeller of a blower for circulating the coolant gas, and a diffusing casing associated with the impeller.

Referring now more particularly to Figure 2 the blower is disposed at the bottom of the heat exchanger vessel 2, the axis of the blower lying on the axis of the vessel. The blower comprises an electric driving motor contained within the housing 6 and an impeller 7 mounted on a shaft 8 connected to the motor shaft 9 through the coupling 10, a diffusing casing 11, horizontally arranged, being associated with the impeller 7.

As shown in Figure 2, this diffusing casing 11 is in the form of an annulus surrounding the impeller 7, which is of the centrifugal type with blades 12 and a central curved boss or projection 13. From the heat exchanger elements 14 the coolant gas is drawn into the inlet fairing 15, past the bellows 16 to the impeller 7, whence it is ejected into the diffusing casing 11 and through its outlet diffusing funnels 17 into the lower enclosed region 18 of the heat exchanger vessel 2. An outlet 19 connects the region 18 with the ducting 3 leading to the reactor core pressure vessel.

The diffusing casing 11 for the impeller 7 is supported on spaced radial struts 20 between which the gas can penetrate as far as the flanged bolted joint 21 between the lower branch or nozzle of the heat exchanger vessel 2 and the domed housing 6 containing the electric driving motor for the impeller. The joint 21 has therefore to withstand the full difference between the gas pressure within the heat exchanger and the pressure of the atmosphere outside it, and in the present embodiment of the invention this full pressure difference is also borne by a gas tight seal in the region 22 where the impeller shaft 8 passes through the top 23 of the housing 6. The means provided at 22 for guiding the upper end of the impeller shaft 8, which is guided at its lower end where it meets the coupling 10 by bearings supported from vanes or struts 24 attached at their outer ends to the casing 6, must therefore also retain the gas pressure in the vessel 2. The impeller 7 and its casing 11 are thus both effectively contained within the pressure vessel of the heat exchanger 2 while, in this instance, the motor in its housing 6 is outside the pressure vessel and runs under atmospheric conditions. Alternatively, the gas tight seal at 22 may be dispensed with and the housing 6 may be designed as a continuation of the pressure vessel of the heat exchanger 2, the motor within this vessel then running under full pressure conditions.

The long housing 6 shown in Figure 2 is intended for a double wound D.C. motor with commutators at both ends and one advantage of the gas-tight seal at 22 is that servicing of the motor is greatly facilitated. Thus, the housing 6 may be split into an upper and a lower portion by unbolting, say, the flange 25; the coupling 10 is disconnected and the motor with its shaft 9 and the whole of the lower portion of the housing are lowered to a convenient point, having first removed the service platforms 26, railings and access ladder 27. Such lowering may be effected by a winch (not shown) for a rope 28 passing over an upper set of pulleys 29 on the pressure vessel of the heat exchanger 2 and a lower set of pulleys 30 fixed to the lower portion of the housing 6. When it is required to service the impeller 7, the interior of the heat exchanger 2 is reduced to atmospheric pressure and the joint 21 is unbolted, when the same rope and pulley system will be effective to lower the motor, the whole of the housing 6 including its top 23, the shafts 8 and 9 and coupling 10, the seal at 22 and the impeller 7 with its base 31 having a tongued periphery 32 mating with the impeller casing 11. This impeller casing 11 together with its diffusing funnels 17 is in this example mounted permanently on its struts 20 at the bottom of the heat exchanger 2, together with the upper cover plate 33 of the impeller, but if desired the bottom of the pressure vessel 2 may be modified so that the casing 11 may be removed together with the remainder of the blower parts.

The disposition of the impeller 7 and diffusing casing 11 in the vessel 2 besides simplifying the construction of the casing 11, leads to other advantages in the general construction of the nuclear reactor arrangement. In a conventional arrangement in which a centrifugal blower forms a unit separate from a reactor vessel and a heat exchanger vessel, the ducting through which the coolant gas is returned from the heat exchanger to the blower and thence to the reactor is inevitably complicated by the number of bends required in the ducting and by virtue of the fact that it is impossible to arrange the ducting in one plane.

In the present arrangement, by virtue of the fact that there is no intermediate unit in the ducting between the heat exchanger and the reactor, this difficulty is overcome. The ducting can be arranged with the minimum number of bends, thus reducing the pressure losses therein, and in addition, all the ducting can be arranged in one plane. Problems of nuclear expansion are thereby reduced, and means provided to absorb this nuclear expansion become very simple compared with the means which would be required for this purpose were the ducting not arranged to lie in one plane. An example of this arrangement of ducting in one plane with nuclear expansion absorbing means 34 is shown in Figure 1.

Further, blower machinery and auxiliary gear constructed according to the present invention requires no building to house it other than that already provided by the supporting structure for the heat exchanger, whereas in a conventional arrangement, a separate building would be required to house the blowers. The present invention therefore enables a considerable area of ground to be saved at the site of construction.

I claim:

1. In a nuclear reactor arrangement comprising a reactor core, at least one heat exchanger, and pressure vessels at least for said reactor core and heat exchanger, said pressure vessels being capable of withstanding the stresses caused by a gaseous cooling medium adapted to be circulated under pressure through the arrangement that improvement comprising a blower for circulating said gaseous cooling medium, said blower having a diffusing casing and an impeller connected by a shaft to a driving means, said impeller and diffusing casing being situated at the bottom of the interior of a heat exchanger pressure vessel and said shaft passing through a gas-tight seal in the base of said heat exchanger pressure vessel adapted to maintain the full pressure of the gas within said vessel while allowing said driving means, situated outside said vessel, to run under atmospheric conditions.

2. In a nuclear reactor arrangement comprising a reactor core, at least one heat exchanger, and pressure vessels at least for said reactor core and heat exchanger, said pressure vessels being capable of withstanding the stresses caused by a gaseous cooling medium adapted to be circulated under pressure through the arrangement that improvement comprising a blower for circulating said gaseous cooling medium, said blower having a diffusing casing and an impeller connected by a shaft through a coupling to a driving means, said impeller and diffusing casing being situated at the bottom of the interior of one of said pressure vessels and said shaft passing through a gas-tight seal in the base of said pressure vessel adapted to maintain the full pressure of the gas within said vessel while allowing said driving means, situated outside said vessel, to run under atmospheric conditions, and hoist means adapted, after the uncoupling of said driving means from said impeller, to lower said driving means away from said pressure vessel to permit servicing of said driving means.

3. In a nuclear reactor arrangement comprising a reactor core, at least one heat exchanger, and pressure vessels at least for the said reactor core and heat exchanger, said pressure vessels being capable of withstanding the stresses caused by a gaseous cooling medium adapted to be circulated under pressure through the arrangement that improvement comprising a blower for circulating said gaseous cooling medium, said blower having a diffusing casing and an impeller connected by a shaft to a driving means, said impeller and diffusing casing being situated at the bottom of the interior of one of said pressure vessels and said shaft passing through a gas-tight seal in the base of said pressure vessel adapted to maintain the full pressure of the gas within said vessel while allowing said driving means, situated outside said vessel, to run under atmospheric conditions, and hoist means adapted to lower the impeller of the blower out of the base of said vessel.

4. In a nuclear reactor arrangement comprising a reactor core, at least one heat exchanger, and pressure vessels at least for said reactor core and heat exchanger, said pressure vessels being capable of withstanding the stresses caused by a gaseous cooling medium adapted to be circulated under pressure through the arrangement that improvement comprising a blower for circulating said gaseous cooling medium, said blower having a diffusing casing and an impeller connected by a shaft to a driving means, said impeller and diffusing casing being situated at the bottom of the interior of one of said pressure vessels and said shaft passing through a gas-tight seal in the base of said pressure vessel adapted to maintain the full pressure of the gas within said vessel while allowing said driving means, situated outside said vessel, to run under atmospheric conditions and hoist means adapted to lower the impeller and diffusion casing of the blower out of the base of said vessel.

5. In a nuclear reactor arrangement comprising a reactor core, at least one heat exchanger, and pressure vessels at least for said reactor core and heat exchanger, said pressure vessels being capable of withstanding the stresses casued by a gaseous cooling medium adapted to be circulated under pressure through the arrangement that improvement comprising a blower for circulating said gaseous cooling medium, said blower having a diffusing casing and an impeller connected by a shaft through a coupling to a driving means, said impeller and diffusing casing being situated at the bottom of the interior of one of said pressure vessels and said shaft passing through a gas-tight seal in the base of this pressure vessel adapted to maintain the full pressure of the gas within the vessel while allowing said driving means, situated outside said vessel, to run under atmospheric conditions, and hoist means adapted, after the uncoupling of said driving means from said impeller, to lower said driving means away from said pressure vessel to permit servicing of said driving means, said hoist means being also adapted to lower said impeller of said blower out of the base of said vessel.

6. In a nuclear reactor arrangement comprising a reactor core, at least one heat exchanger, and pressure vessels at least for said reactor core and heat exchanger, said pressure vessels being capable of withstanding the stresses caused by a gaseous cooling medium adapted to be circulated under pressure through the arrangement that improvement comprising a blower for circulating said gaseous cooling medium, said blower having a diffusing casing and an impeller connected by a shaft through a coupling to a driving means, said impeller and diffusing casing being situated at the bottom of the interior of one of said pressure vessels and said shaft passing through a gas-tight seal in the base of this pressure vessel adapted to maintain the full pressure of the gas within the vessel while allowing said driving means, situated outside the vessel, to run under atmospheric conditions, and hoist means adapted, after the uncoupling of said driving means from said impeller, to lower said driving means away from said pressure vessel to permit servicing of said driving means, said hoist means being also adapted to lower said impeller and said diffusing casing out of the base of said vessel.

References Cited in the file of this patent

UNITED STATES PATENTS

| | | |
|---|---|---|
| 1,010,134 | Fortescue | Nov. 28, 1911 |
| 1,307,656 | Camberos | June 24, 1919 |
| 1,924,447 | Landauer | Aug. 29, 1933 |
| 2,362,044 | Blancha | Nov. 7, 1944 |
| 2,782,158 | Wheeler | Feb. 19, 1957 |
| 2,809,931 | Daniels | Oct. 15, 1957 |
| 2,815,321 | Wigner et al. | Dec. 3, 1957 |
| 2,816,068 | Ruano | Dec. 10, 1957 |
| 2,840,522 | Young et al. | June 24, 1958 |
| 2,863,815 | Moore et al. | Dec. 9, 1958 |

OTHER REFERENCES

Popular Mechanics, June 1954, pages 74, 75.